Figure 1:
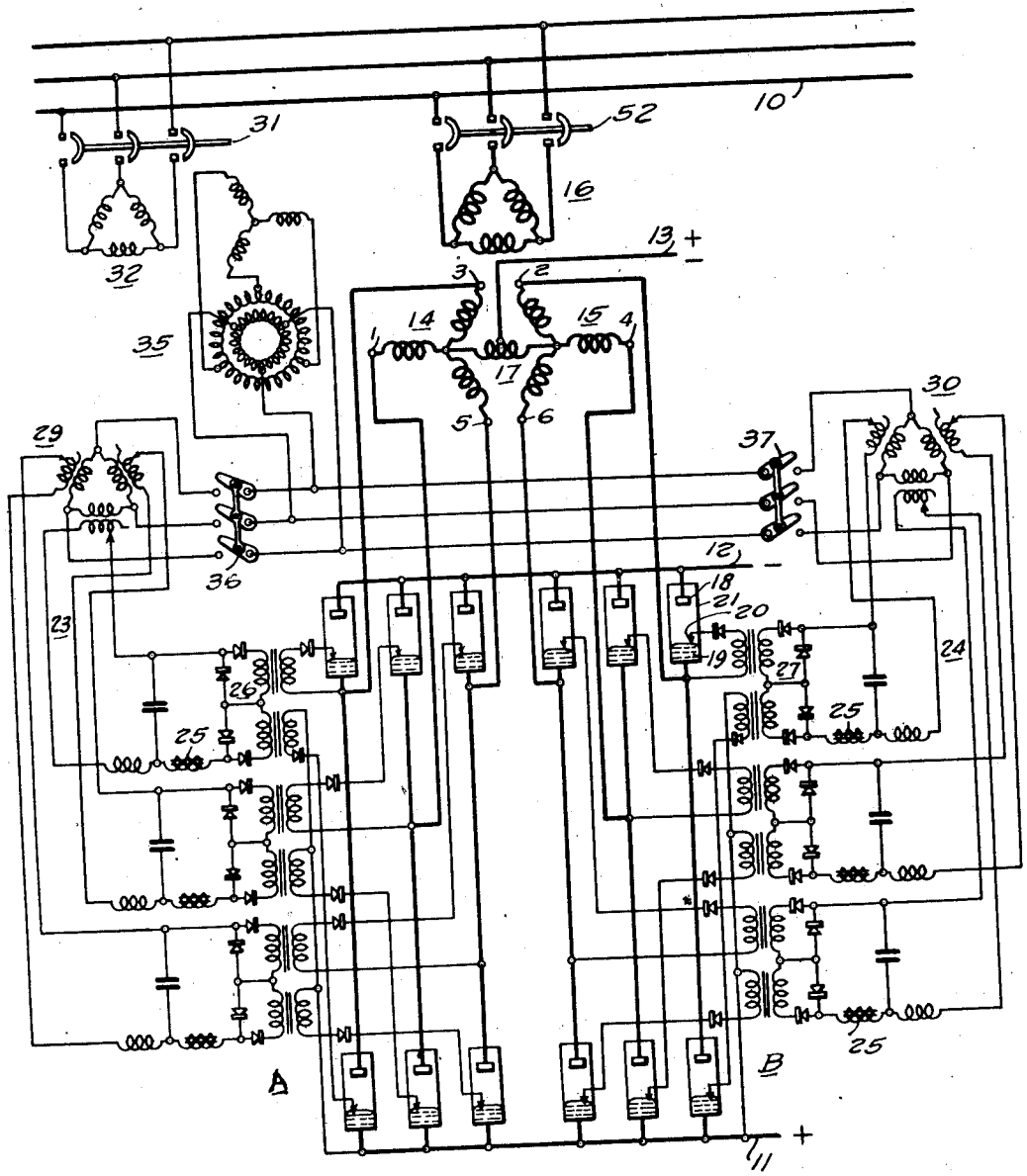

Patented Oct. 7, 1947

2,428,543

UNITED STATES PATENT OFFICE 2,428,543

CONVERSION SYSTEM

John L. Boyer, Wilkinsburg, and Herbert A. Rose, Pittsburgh, Pa., assignors to Westinghouse Electric Corporation, East Pittsburgh, Pa., a corporation of Pennsylvania Application December 16, 1943, Serial No. 514,524

3 Claims. (Cl. 175—363)

Our invention relates to an electric-current conversion system and particularly to a conversion system for interconnecting a three-wire or other plural-voltage direct-current system and an alternating-current system.

It has heretofore been proposed to utilize the Graetz or bridge connected rectifier to interconnect plural-voltage direct-current circuits and alternating-current circuits. These systems have heretofore had the disadvantage that the harmonic ripple was of relatively low frequency and relatively great magnitude between the neutral and either outside wire.

A disadvantage of the prior art in bridge connected rectifier and inverter systems has been that poor utilization of the transformer windings resulted when the apparatus was operated at unbalanced loads or at fractional capacity with one portion of the system of valves inoperative. According to our invention, we provide a conversion system utilizing a plurality of bridge-connected rectifiers and an interconnected transformer system obviating these disadvantages, and having the further advantage of a high-frequency multi-phase ripple across either the whole or partial voltages of the direct-current system. Our system has the further advantage that almost the full capacity of the transformer can be taken at the partial voltages provided the electric valves are not overloaded. Our system has the further advantages under fractional capacity operation and unbalanced loading of not requiring zig zag windings to avoid magnetic saturation of the transformer and resultant poor power factor operation.

Our system has a further advantage in the case of changing from one mode of operation to another, e. g. full capacity to fractional capacity, that the transfer is made without essential change in the character or magnitude of the output voltage.

According to our invention, each of the bridge-connected rectifiers is provided with a substantially independent transformer and these transformers are interconnected by means of interphase transformers which provide the third wire or intermediate terminal of the multivoltage direct-current circuit.

Our system also has the further advantage that it may be utilized in high-voltage systems to lower the inverse voltage across each of the individual valves of the converter while increasing the utilization factor of the conversion transformer.

It is, accordingly, an object of our invention to provide a bridge-connecting rectifier having a high frequency multiphase voltage ripple throughout the direct-current system, across the full voltage and the half voltage.

It is a further object of our invention to provide a conversion system having a high utilization factor in the transformer that supplies power to the rectifying portion of the system.

It is a further object of our invention to provide a conversion system which may be utilized in sections or parts to provide various modes of operation to meet various load conditions.

It is a further object of our invention to provide a conversion system adapted to fractional capacity and unbalanced operation in which a high operating power factor is obtained without magnetic saturation of the transformer.

Figure 2:
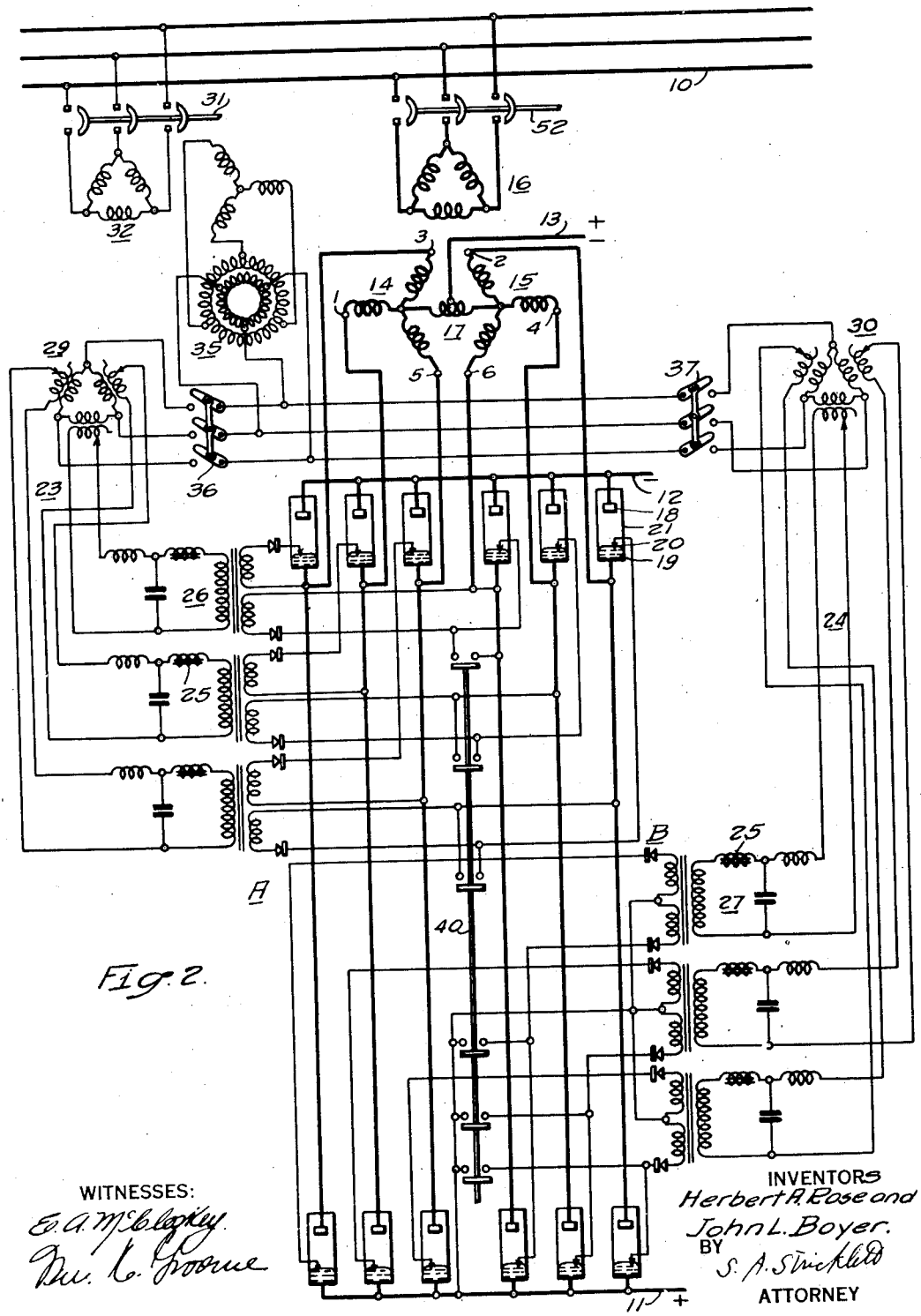

Other objects and advantages of our invention will be apparent from the following detailed description taken in conjunction with the accompanying drawings, in which Figure 1 is a schematic illustration of a conversion system utilizing our invention; and Fig. 2 is a further modification according to our invention.

In the exemplary embodiment of our invention according to Fig. 1, an alternating-current circuit 10 herein shown as a polyphase circuit is connected to a direct-current circuit having a positive terminal 11, a negative terminal 12 and an intermediate or neutral terminal 13 through a plurality of bridge-connected rectifiers A—B, herein shown as two for reasons of simplicity, although any number greater than two may be used. Each of the rectifiers includes a plurality of parallel operating arms, each of which comprises a pair of serially-connected electric valves, herein illustrated as of the make-alive type, connected between the positive and negative terminals 11 and 12 of the direct-current circuit. The alternating-current circuit 10 is connected, intermediate the valves of the several pairs of valves, by means of a plurality of star-connected transformer windings 14 and 15, with the winding 14 having terminals 1, 3, 5 and the winding 15 having terminals 2, 4, 6. The star-connected windings 14 and 15 may correspond in phase terminals to the phases of the alternating-current circuit 10, but obviously any desirable transformer terminal arrangement may be provided.

Each of the transformer windings 14 and 15 may be associated with its own primary winding which is connected to the alternating-current circuit 10 by a circuit breaker 52. However, for simplicity of illustration, we have shown the transformer windings 14, 15 as being energized from the same primary winding 16. To secure the greatest benefit from the connecting system, it is desirable that the various star-connected windings 14, 15 be arranged in out-of-phase relationship to each other either as shown, being oppositely disposed in phase relationship, or by utilizing zigzag windings or phase shifting transformers any desired phase relationship may, of course, be obtained.

The intermediate or neutral connection 13 is made to the transformer 14 and 15 by means of a suitable interphase transformer 17. When the direct-current load is at full voltage, or when the various portions of the direct-current load are balanced, only exciting current will flow in the interphase transformer 17. However, if unbalanced currents flow in various portions of the direct-current circuit, the unbalanced current will also flow in the interphase transformer 17.

While any type of electric valve may be utilized in our converting system, we prefer, for reasons of illustration, to use vapor-electric valves of the make-alive type, in which each valve comprises an anode 18, a vaporizable reconstructing cathode 19 usually of mercury, and a make-alive electrode 20 contained in a suitable evacuated chamber 21. Control of the current flow in the various valves is provided by wave distorting networks 23 and 24, herein shown as of the saturable reactor type in which saturable reactors 25 transform a substantially sine wave of control potential to produce periodic current impulses of opposite polarity, and polarity selective networks 26 and 27 for applying the current impulses to selected ones of the valves. Suitable transformer means 29 and 30 are perferably utilized for providing substantially independent potentials to each of the reactor circuits from a suitable source of alternating-current, herein indicated as the alternating-current circuit 10, although any available alternating-current circuit of proper frequency and fixed phase relation may be utilized. An insulating transformer 32 is connected to the alternating-current circuit 10 by a circuit breaker 31 with a phase-shifting arrangement, such as the rotary phase shifter 35, interposed between the source 10 and the impulsing circuits 23 and 24, to control the firing time and, therefore, the voltage output of the bridge-connected rectifiers A and B. Each of the bridge-connected rectifiers is provided with a similar firing system; and disconnecting switches 36 and 37 are provided between each of the firing systems 23 and 24 and the source 10. One or more of the firing systems 23 or 24 may be disconnected, to thereby render its associated rectifier A or B inoperative at low loads which would not provide excitation current for the interphase transformer, thus preventing a low load voltage rise because of the nonaction of the interphase transformer.

In the modification according to Fig. 1, each of the bridge-connected rectifiers A and B has its own independent firing system 23 or 24. However, all of the load may appear between one of the terminals 11 or 12 and the intermediate terminal 13. The loaded half of the system then operates as a multiple polyphase system at the partial voltage.

In the modification according to Fig. 2, we have shown an interlinking firing system, in which each firing system 23 and 24 controls one-half of each of the bridge-connected rectifiers A and B. With this connection, it is possible, by operating the disconnecting switches 36 or 37 to one or the other of the impulsing systems 23 or 24, to render a portion of all of the bridge-connected rectifiers A and B inoperative, in which case the remaining valves of all of the bridge-connected rectifiers would operate as a multiple $n$-phase conversion system at the normal intermediate potential. A switching device 40 is provided, so that, at low loads on the multiple voltage system, one of the bridge-connected rectifiers, such as B, may be rendered inoperative, by shorting out its make-alive electrodes, so that the remaining bridge-connected section of the unit may be used to carry the entire load.

In the operation of our system, either at full voltage or at full load, all of the bridge-connected rectifiers are operated by rendering their firing systems 23 and 24 operative by connecting them to the source 10 of control potential, the load potential being controlled by means of the phase-shifting device 35. If the load condition should change so that full voltage is required at only a partial load capacity, one of the bridge-connected rectifiers A or B may be rendered inoperative by discontinuing its control impulses, either by short circuiting the igniters as shown in Fig. 2, or by opening the connecting switch 36 or 37, as shown in Fig. 1. If only partial voltage operation is required, one or the other of the series-connected valve groups may be rendered inoperative by opening the control switch 36 or 37, as shown in Fig. 2, reducing the connection from a multiple parallel bridge connection to a multiple $n$-phase system.

While for purposes of illustration, we have shown and described specific embodiments of our invention, it will be apparent that changes and modifications can be made therein without departing from the true spirit of our invention.

We claim as our invention:

1. A conversion system interconnecting an alternating-current circuit and a multiple voltage direct-current circuit, comprising a plurality of bridge-connected rectifiers, each of said rectifiers comprising a plurality of pairs of series-connected valves between the maximum voltage terminals of said circuit, a star-connected winding for each of said bridge-connected rectifiers, the terminals of said star-connected windings being connected intermediate said pairs of valves, said star-connected windings being inductively coupled to said alternating-current circuit, an interphase winding means interconnecting said star-connected windings, an intermediate voltage terminal of said plural-voltage direct-current circuit being connected to said interphase winding means, substantially independent excitation systems for each of said bridge-connected rectifiers and means for selectively rendering one of said excitation systems inoperative to change the mode of operation of said conversion system.

2. An electric current conversion system interconnecting an n-phase alternating-current circuit with a three-wire direct-current circuit, comprising a plurality of groups of electric valves, each group of valves including $n$ pairs of series-connected valves, each of said pairs being connected between the negative and positive terminals of the direct-current circuit, transformer means having $n$ phase terminals connected intermediate the valves of each pair of valves, and interphase transformer means interconnecting said transformer means, the neutral terminal of said direct-current circuit being connected to said interphase transformer means, and means for selectively determining the excitation of a portion of said valves for varying the load characteristic of said conversion system.

3. An electric conversion system comprising a polyphase alternating-current circuit, a three-wire direct-current circuit, a plurality of groups of series-connected electric valves connected between the positive and negative wires of said direct-current circuit, means for connecting said alternating-current circuit to said valve groups at points between the series connected valves, interphase transformer means connected between said valve groups, the third wire of said direct-current circuit being connected to said interphase transformer means, and means for selectively blocking the excitation of certain of said valves for varying the load characteristics of said system.

JOHN L. BOYER.
HERBERT A. ROSE.

REFERENCES CITED

The following references are of record in the file of this patent:

UNITED STATES PATENTS

| Number | Name | Date |
| --- | --- | --- |
| 2,141,922 | Lord | Dec. 27, 1938 |
| 2,300,872 | Cox | Nov. 3, 1942 |
| 979,396 | Thomas | Dec. 20, 1910 |
| 1,389,147 | Lovell | Aug. 30, 1921 |

OTHER REFERENCES

"Mercury Arc Rectifiers and Circuits" by Prince and Vogdes, pub. by McGraw-Hill, 1st ed., 1927, pp. 99 and 102.